(12) United States Patent
Sasaki

(10) Patent No.: US 11,489,355 B2
(45) Date of Patent: Nov. 1, 2022

(54) BATTERY PACK, CONTROL DEVICE, CONTROL METHOD, AND PROGRAM

(71) Applicant: Envision AESC Japan Ltd., Zama (JP)

(72) Inventor: Hiroshi Sasaki, Sagamihara (JP)

(73) Assignee: Envision AESC Energy Devices Ltd., Sagamihara (JP)

(*) Notice: Subject to any disclaimer, the term of this patent is extended or adjusted under 35 U.S.C. 154(b) by 34 days.

(21) Appl. No.: 16/644,056

(22) PCT Filed: Aug. 28, 2018

(86) PCT No.: PCT/JP2018/031787
§ 371 (c)(1),
(2) Date: Mar. 3, 2020

(87) PCT Pub. No.: WO2019/044842
PCT Pub. Date: Mar. 7, 2019

(65) Prior Publication Data
US 2021/0066934 A1    Mar. 4, 2021

(30) Foreign Application Priority Data
Sep. 4, 2017  (JP) ............................. JP2017-169409

(51) Int. Cl.
*H02J 7/00* (2006.01)
*B60L 50/60* (2019.01)
(Continued)

(52) U.S. Cl.
CPC ............ *H02J 7/0047* (2013.01); *B60L 50/60* (2019.02); *B60L 58/10* (2019.02); *B64D 27/24* (2013.01);
(Continued)

(58) Field of Classification Search
CPC ...... H02J 7/0047; H02J 7/0031; H02J 7/0063; H02J 7/00; H02J 50/12; H02J 50/90;
(Continued)

(56) References Cited

U.S. PATENT DOCUMENTS 4,655,039 A * 4/1987 McCabe ................... B66F 9/20
417/218
2015/0132615 A1* 5/2015 Yun ........................ G01K 13/00
429/61
(Continued)

FOREIGN PATENT DOCUMENTS

CN    101164213 A    4/2008
CN    101315995 B * 12/2011 ............ H01M 10/42
(Continued)

OTHER PUBLICATIONS

CN 101315995 B, Battery Pack, Device and Charge Control Method, Jul. 12, 2011, pp. 1-10.*
(Continued)

*Primary Examiner* — Binh C Tat
(74) *Attorney, Agent, or Firm* — Sughrue Mion, PLLC

(57) ABSTRACT

A battery pack (2000) includes a secondary battery (2020), a sensor (2040), and a control device (2060). The secondary battery (2020) supplies electric power to a flying object (10). The sensor (2040) outputs a measurement value related to a force applied to the secondary battery (2020) or a periphery of the secondary battery. The control device (2060) has a determination unit (2062). The determination unit (2062) determines a danger level of the secondary battery (2020) based on the measurement value of the sensor (2040).

15 Claims, 13 Drawing Sheets

(51) Int. Cl.
*B60L 58/10* (2019.01)
*H01M 50/581* (2021.01)
*B64D 27/24* (2006.01)
*B64D 45/00* (2006.01)
*G08B 21/18* (2006.01)
*H01M 10/44* (2006.01)
*H01M 10/48* (2006.01)

(52) U.S. Cl.
CPC ............ *B64D 45/00* (2013.01); *G08B 21/182* (2013.01); *H01M 10/44* (2013.01); *H01M 10/48* (2013.01); *H01M 50/581* (2021.01); *H02J 7/0031* (2013.01); *H02J 7/0063* (2013.01); *B60L 2200/10* (2013.01); *H01M 2200/103* (2013.01); *H01M 2220/20* (2013.01)

(58) Field of Classification Search
CPC .. H02J 50/60; H02J 50/70; H02J 50/80; H02J 50/50; H02J 7/025; H02J 5/005; H02J 7/00304; H02J 7/00309; H02J 7/0029; H02J 50/502; H02J 50/005; H02J 50/05; H02J 7/35; H02J 2310/48; H02J 50/40; H02J 50/402; H02J 50/10; H02J 7/00034; H02J 7/00045; H02J 2300/28; H02J 2310/40; H02J 3/322; H02J 7/0027; H02J 7/34; H02J 2207/40; H02J 50/20; H02J 50/23; H02J 50/30; H02J 7/0048; H02J 50/15; B60L 50/60; B60L 58/10; B60L 2200/10; B60L 53/12; B60L 53/302; B60L 2240/527; B60L 3/0046; B60L 53/62; H01M 50/581; H01M 10/44; H01M 10/48; H01M 2200/103; H01M 2220/20; B64D 27/24; B64D 45/00; G08B 21/182; G08B 21/18; H03H 1/00; H03H 7/40; H03H 2001/0057

USPC .................................................. 320/126–136
See application file for complete search history.

(56) References Cited

U.S. PATENT DOCUMENTS

2017/0008418 A1* 1/2017 Ciampolini ............. B60L 58/12
2017/0368941 A1 12/2017 Chow
2019/0121809 A1* 4/2019 Murthy ............... G06F 16/9535

FOREIGN PATENT DOCUMENTS

| | | |
|---|---|---|
| CN | 104704697 A | 6/2015 |
| JP | H11-40205 A | 2/1999 |
| JP | 2008-535457 A | 8/2008 |
| JP | 2013-74707 A | 4/2013 |
| JP | 2014-230473 A | 12/2014 |
| JP | 2015-091199 A | 5/2015 |
| JP | 2016-116310 A | 6/2016 |
| JP | 2016-222244 A | 12/2016 |
| JP | 2017-065467 A | 4/2017 |
| JP | 2018-007542 A | 1/2018 |
| WO | 2006/112667 A1 | 10/2006 |
| WO | 2014057538 A1 | 4/2014 |
| WO | 2017/086234 A1 | 5/2017 |
| WO | 2017086234 A1 * | 5/2017 ............. B64D 39/02 |

OTHER PUBLICATIONS

International Search Report for PCT/JP2018/031787 dated Nov. 13, 2018 (PCT/ISA/210).
Communication dated Jun. 14, 2022 from the Japanese Patent Office in Application No. 2019-539539.

* cited by examiner

BATTERY PACK, CONTROL DEVICE, CONTROL METHOD, AND PROGRAM

CROSS REFERENCE TO RELATED APPLICATIONS

This application is a National Stage of International Application No. PCT/JP2018/031787 filed Aug. 28, 2018, claiming priority based on Japanese Patent Application No. 2017-169409, filed Sep. 4, 2017 the disclosures of which are incorporated herein in their entirety.

TECHNICAL FIELD

The present invention relates to monitoring of a state of a secondary battery.

BACKGROUND ART

A flying object, such as a drone, that flies using a secondary battery is developed. For example, Patent Document 1 is provided as a document which discloses a technology related to the flying object.

RELATED DOCUMENT

Patent Document

[Patent Document 1] Japanese Patent Application Publication No. 2017-065467

SUMMARY OF THE INVENTION

Technical Problem

The inventor finds a new technology for recognizing a state of a secondary battery that supplies electric power to a flying object. An object of the present invention is to provide the new technology for recognizing the state of the secondary battery that supplies the electric power to the flying object.

Solution to Problem

According to the present invention, a battery pack includes 1) a secondary battery that supplies electric power to a flying object, 2) a sensor that outputs a measurement value related to a force applied to the secondary battery or a periphery of the secondary battery, and 3) a control device.

The control device includes a determination unit that determines a danger level of the secondary battery based on the measurement value of the sensor.

The control device of the present invention is a control device included in the battery pack of the present invention.

According to the present invention, a control method is executed by a control device that controls a battery pack. The battery pack includes a secondary battery that supplies electric power to a flying object, and a sensor that outputs a measurement value related to a force applied to the secondary battery or a periphery of the secondary battery.

The control method includes a determination step of determining a danger level of the secondary battery based on the measurement value of the sensor.

According to the present invention, a program causes a control device that controls a battery pack to execute steps included in a control method of the present invention.

Advantageous Effects of Invention

According to the present invention, there is provided a new technology for recognizing a state of a secondary battery which supplies electric power to a flying object.

BRIEF DESCRIPTION OF THE DRAWINGS

The above-described object and other objects, features, and advantages will be further clarified by example embodiments which will be described below and the accompanying drawings below.

DESCRIPTION OF EMBODIMENTS

Hereinafter, example embodiments of the present invention will be described with reference to the accompanying drawings. The same reference symbols are given to the same components throughout the drawings, and the description thereof will be repeated. Unless specifically described, each block in a block diagram represents a configuration in a functional unit instead of a configuration in a hardware unit. Unless otherwise mentioned, a predetermined value or a reference value may be set in advance in a functional component unit using the value, or may be stored in a storage apparatus accessible from the functional component unit.

First Example Embodiment

Figure 1:
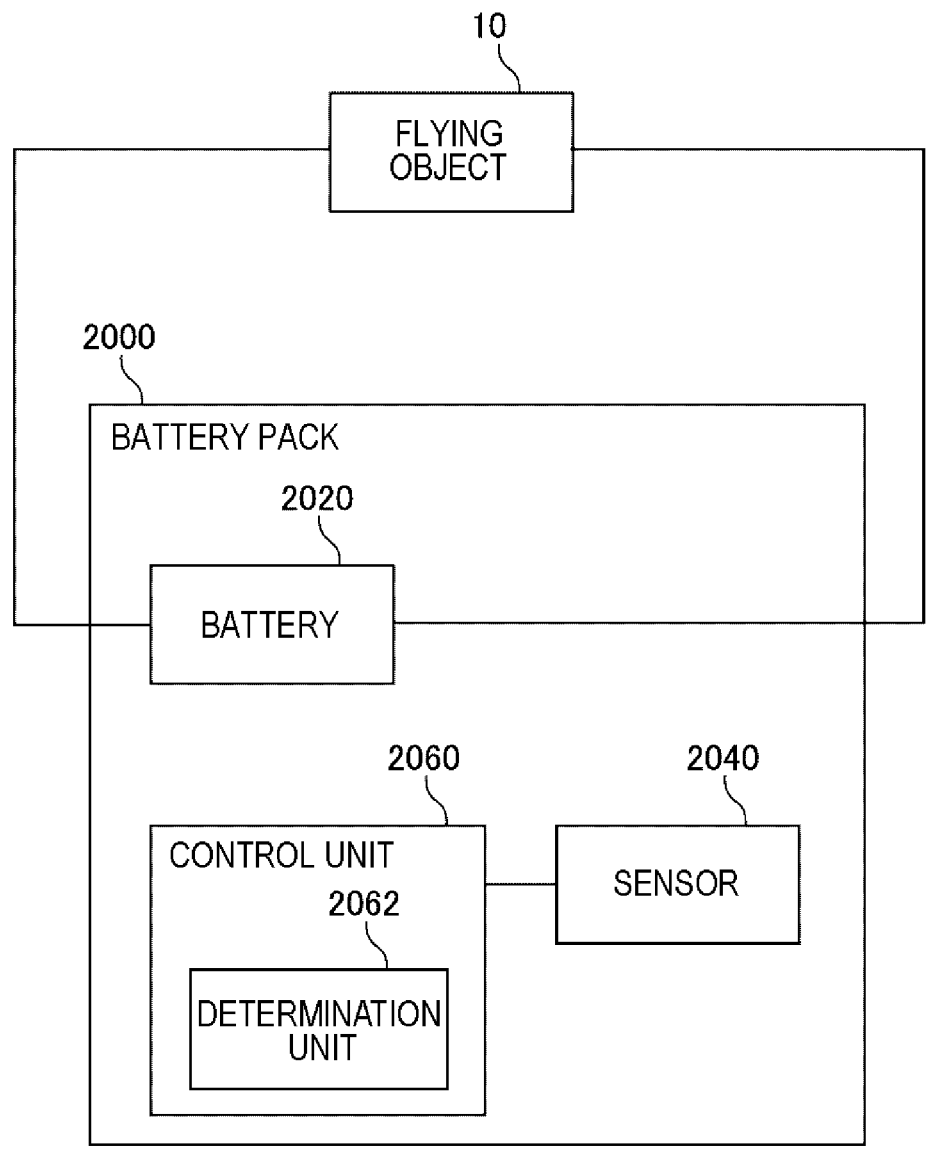
FIG. 1 is a diagram illustrating a battery pack according to a first example embodiment together with a use environment thereof.

FIG. 1 is a diagram illustrating a battery pack 2000 of a first example embodiment together with a use environment thereof. The battery pack 2000 includes a secondary battery 2020. The secondary battery 2020 is a unit cell of an arbitrary secondary battery (for example, a lithium ion battery) or an assembled battery in which a plurality of unit cells of the secondary battery are connected. Hereinafter, the unit cell of the secondary battery is also expressed as a battery cell.

The battery pack 2000 is connected to a flying object 10. The flying object 10 is an arbitrary flying object driven by electric power supplied from the battery pack 2000. For example, the flying object 10 is a drone or the like. The battery pack 2000 may be stored on an inside of the flying object 10 or may be fixed to an outer peripheral surface of the flying object 10.

The battery pack 2000 further includes a sensor 2040 and a control device 2060. The sensor 2040 is a sensor that outputs a measurement value related to a force applied to the secondary battery 2020 or a periphery of the secondary battery 2020.

The control device 2060 is an apparatus that controls the secondary battery 2020. Specifically, the control device 2060 includes a determination unit 2062. The determination unit 2062 determines a danger level of the secondary battery 2020 based on the measurement value output by the sensor 2040.

<Advantageous Effect>

According to the battery pack 2000 of the present example embodiment, the danger level of the secondary battery 2020 is determined based on the measurement value of the sensor 2040 related to the force applied to the secondary battery 2020 or the periphery of the secondary battery 2020. As will be described later, in a case where the measurement value of the sensor 2040 is used, it is possible to recognize various pieces of information such as a magnitude of a pressure, an impact, or a vibration applied to the secondary battery 2020 or the periphery of the secondary battery 2020, whether or not the flying object 10 is falling, and whether a pose of the flying object 10 is normal. Therefore, according to the battery pack 2000 of the present example embodiment, by using these pieces of information, it is possible to recognize whether or not a state of the secondary battery 2020 that supplies the electric power to the flying object 10 is a dangerous state.

<Overview of Hardware Configuration of Control Device 2060>

The control device 2060 may be realized only by hardware (for example, a hard-wired electronic circuit or the like), or may be realized by a combination of the hardware and software (for example, a combination of an electronic circuit and a program for controlling the electronic circuit, or the like). Hereinafter, a case where the control device 2060 is realized by the combination of the hardware and the software will be further described.

Figure 2:
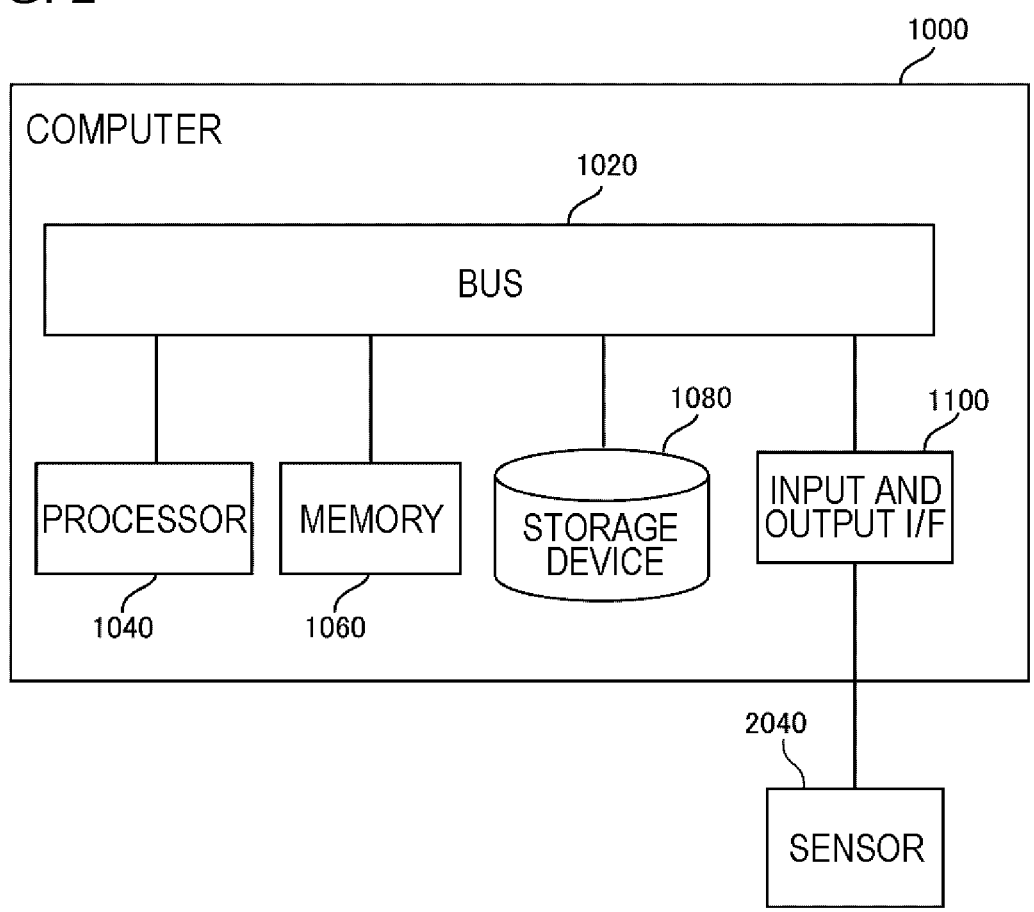
FIG. 2 is a diagram illustrating a computer for realizing a control device.

FIG. 2 is a diagram illustrating a computer 1000 for realizing the control device 2060. For example, the computer 1000 is a Battery Management Unit (BMU). The computer 1000 may be a dedicated computer designed to realize the control device 2060, or may be a general-purpose computer.

The computer 1000 includes a bus 1020, a processor 1040, a memory 1060, a storage device 1080, and an input and output interface 1100. The bus 1020 is a data transmission path through which the processor 1040, the memory 1060, the storage device 1080, and the input and output interface 1100 transmit and receive data with each other. However, a method for connecting the processor 1040 and the like is not limited to bus connection. The processor 1040 is a processor realized by a Microprocessor (MPU) or the like. The memory 1060 is a main storage apparatus realized using an arbitrary Access Memory (RAM) or the like. The storage device 1080 is an auxiliary storage apparatus realized using a Read Only Memory (ROM), a flash memory, or the like.

The input and output interface 1100 is an interface for connecting the computer 1000 to another device. For example, the computer 1000 is connected to the sensor 2040 through the input and output interface 1100.

The storage device 1080 stores a program module for realizing each function (the determination unit 2062 or the like) included in the control device 2060. In a case where the processor 1040 reads out and executes the program module in the memory 1060, each function of the control device 2060 is realized.

<<Sensor 2040>>

It is possible to use various sensors as the sensor 2040. For example, the sensor 2040 includes a pressure sensor, an acceleration sensor, or the like. The sensor 2040 may be provided at a position that comes into contact with the secondary battery 2020 (for example, on an outer peripheral surface of the secondary battery 2020), or may be provided at a position that does not come into contact with the secondary battery 2020. In a latter case, it is preferably that the sensor 2040 is installed at a position where it is possible to equivalently measure the force applied to the secondary battery 2020. Note that, it is possible to use an existing technology as a technology for determining the position at which it is possible to equivalently measure the force applied to the secondary battery 2020 by a test or the like before operation.

<Process Flow>

Figure 3:
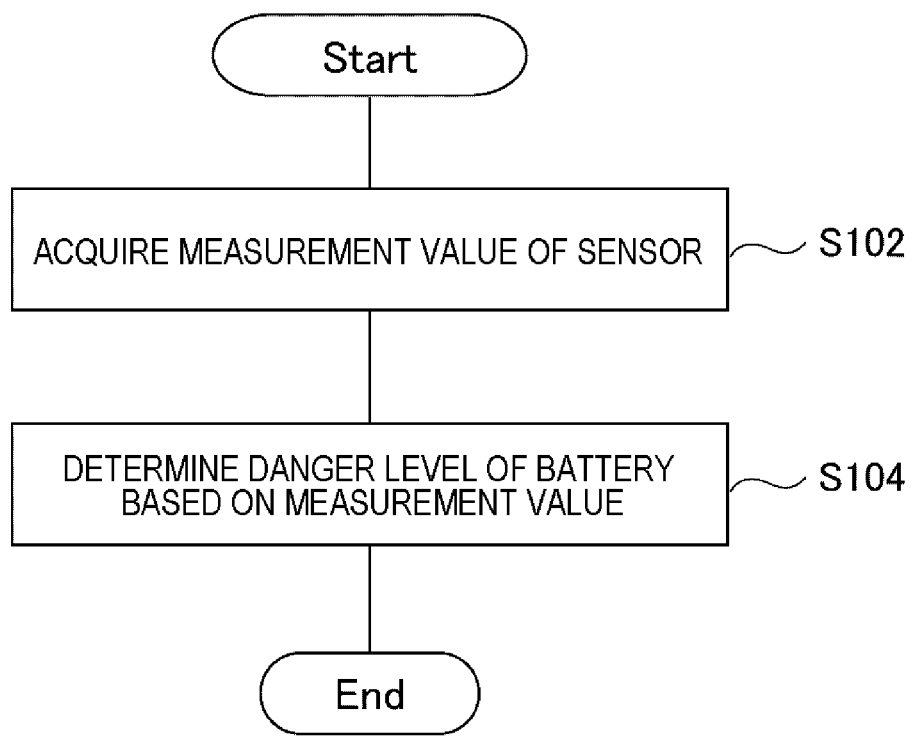
FIG. 3 is a flowchart illustrating a flow of a process executed by the control device.

FIG. 3 is a flowchart illustrating a flow of a process executed by the control device 2060. The determination unit 2062 acquires the measurement value output from the sensor 2040 (S102). The determination unit 2062 determines the danger level of the secondary battery 2020 based on the acquired measurement value (S104).

There are various timings at which the determination unit 2062 judges the danger level. For example, the determination unit 2062 determines the danger level of the secondary battery 2020 using the measurement value whenever the measurement value is output from the sensor 2040.

Alternatively, for example, the determination unit 2062 may periodically judge the danger level of the secondary battery 2020. In this case, for example, whenever a predetermined time elapses, the determination unit 2062 determines the danger level of the secondary battery 2020 using a latest measurement value of the sensor 2040. In another example, whenever a predetermined time elapses, the determination unit 2062 determines the danger level of the secondary battery 2020 using a plurality of measurement values output after a point of time at which a previous danger level of the secondary battery 2020 is determined.

<Danger Level of Secondary Battery 2020>

There are various methods of representing the danger level of the secondary battery 2020. For example, the danger level of the secondary battery 2020 is decided by one of "dangerous" and "not dangerous". In another example, the danger level of the secondary battery 2020 is defined by three or more ranks (hereinafter, a danger level rank). For example, the danger level rank is represented by any of numerical values "1" to "n" (n is an integer which is larger than 3) which mean that it is more dangerous as the value is larger. For example, in a case where n=5, the danger level rank representing the least dangerous is 1 and the danger level rank representing the most dangerous is 5.

<Details of Control Performed by Determination Unit 2062: S104>

The determination unit 2062 determines the danger level of the secondary battery 2020 based on the measurement value output by the sensor 2040 (S104). Hereinafter, a method for determining the danger level will be described in detail.

<<Case of Judging Whether or Not being Danger Level>>

The determination unit 2062 judges whether or not the state of the secondary battery 2020 is dangerous using an index value acquired from the measurement value of the sensor 2040. Note that, a case of judging that the state of the secondary battery 2020 is dangerous means that the danger level of the secondary battery 2020 is set as "dangerous". On the other hand, a case of judging that the state of the secondary battery 2020 is not dangerous means that the danger level of the secondary battery 2020 is set as "not dangerous". Here, the index value acquired from the measurement value of the sensor 2040 may be the measurement value of the sensor 2040 or may be a value computed using the measurement value of the sensor 2040.

For example, it is assumed that the sensor 2040 is a sensor that detects a pressure applied to the secondary battery 2020 or the periphery of the secondary battery 2020. It is possible to use, for example, a pressure sensor as the sensor that detects the pressure. Further, it is possible to use the measurement value of the sensor 2040 as the index value.

The determination unit 2062 judges whether or not the index value is equal to or larger than a reference value. In a case where the index value is equal to or larger than the reference value, the determination unit 2062 judges that the state of the secondary battery 2020 is dangerous. On the other hand, in a case where the index value is smaller than the reference value, the determination unit 2062 judges that the state of the secondary battery 2020 is not dangerous. In this manner, it is possible to detect a situation in which a large pressure is applied to the secondary battery 2020 as a situation in which there is a possibility that the secondary battery 2020 is in the dangerous state.

In another example, it is assumed that the sensor 2040 is a sensor that detects the impact applied to the secondary battery 2020 or the periphery of the secondary battery 2020. It is possible to use, for example, an acceleration sensor as the sensor that detects the impact. It can be mentioned that the magnitude of the impact has a correlation with the amount of change in the measurement value of the acceleration sensor. Here, for example, the control device 2060 computes the amount of change in a unit time value of the measurement value of the acceleration sensor using time-series data of the acceleration sensor, and handles the computed amount of change as the index value.

The determination unit 2062 judges whether or not the index value is equal to or larger than a reference value. In a case where the index value is equal to or larger than the reference value, the determination unit 2062 judges that the state of the secondary battery 2020 is dangerous. On the other hand, in a case where the index value is smaller than the reference value, the determination unit 2062 judges that the state of the secondary battery 2020 is not dangerous. In this manner, it is possible to detect a situation, in which a large impact is applied to the secondary battery 2020, as a situation in which there is a possibility that the secondary battery 2020 is in the dangerous state.

In another example, it is assumed that the sensor 2040 is a sensor that detects the vibration generated in the secondary battery 2020 or the periphery of the secondary battery 2020. For example, it is possible to use the acceleration sensor as the sensor that detects vibration. The vibration is represented by a change in the measurement value in the time-series data of the measurement value of the acceleration sensor. Therefore, for example, the determination unit 2062 computes the magnitude of the vibration represented by the time-series data using the time-series data of the measurement values of the acceleration sensor, and handles the computed magnitude of the vibration as the index value.

The determination unit 2062 judges whether or not the index value is equal to or larger than a reference value. In a case where the index value is equal to or larger than the reference value, the determination unit 2062 judges that the state of the secondary battery 2020 is dangerous. On the other hand, in a case where the index value is smaller than the reference value, the determination unit 2062 judges that the state of the secondary battery 2020 is not dangerous. In this manner, it is possible to detect a situation in which the secondary battery 2020 vibrates greatly as a situation in which there is a possibility that the secondary battery 2020 is in the dangerous state.

Alternatively, for example, the determination unit 2062 may judge whether or not the flying object 10 is falling (whether or not the secondary battery 2020 is falling) using the sensor 2040. In this case, it is possible to use the acceleration sensor as the sensor 2040. For example, in a case where the acceleration sensor is set such that the measurement value in a normal state becomes a value of a gravitational acceleration, the measurement value becomes zero or a value close to zero when the flying object 10 is falling. Here, the determination unit 2062 computes, for example, an absolute value of a difference between the measurement value of the sensor 2040 and a value (zero or the value close to zero) representing that the flying object 10 is falling, and handles the computed value as the index value.

The determination unit 2062 judges whether or not the index value is equal to or smaller than the reference value. In a case where the index value is equal to or smaller than the reference value, the determination unit 2062 judges that the state of the secondary battery 2020 is dangerous. On the other hand, in a case where the index value is larger than the reference value, the determination unit 2062 judges that the state of the secondary battery 2020 is not dangerous. In this manner, it is possible to detect a situation in which the flying object 10 is falling as a situation in which there is a possibility that the secondary battery 2020 is in the dangerous state.

Alternatively, for example, the determination unit 2062 may estimate the pose of the flying object 10 using the measurement value of the sensor 2040. In a case where the pose of the flying object 10 is not a normal pose, there is a high probability that the flying object 10 is not flying in the normal pose, and thus there is a high probability that the secondary battery 2020 is in the dangerous state. A dangerous pose is, for example, an upside-down pose.

It is possible to use a three-axial acceleration sensor as the sensor 2040 for estimating the pose of the flying object 10. In a case where the three-axial acceleration sensor is used, it is possible to estimate the pose of the flying object 10 as a combination of a tilt in an X-axis direction, a tilt in a Y-axis direction, and a tilt in a Z-axis direction.

For example, a range (hereinafter, a reference range) of measurement values of the three-axial acceleration sensor, which represents that the flying object 10 is in the normal pose, is defined in advance. The determination unit 2062 handles a combination of measurement values acquired for the respective axes from the sensor 2040 as an index vector.

The determination unit 2062 judges whether or not the index vector is included in the reference range. In a case where the index vector is not included in the reference range, the determination unit 2062 judges that the state of the secondary battery 2020 is dangerous. On the other hand, in a case where the index vector is included in the reference range, the determination unit 2062 judges that the state of the secondary battery 2020 is not dangerous. In this manner, it is possible to detect a situation in which the pose of the flying object 10 is not normal, as a situation in which there is a possibility that the secondary battery 2020 is in a dangerous state.

Note that, the reference range is represented by a combination of, for example, "a range of measurement values in the X-axis direction, a range of measurement values in the Y-axis direction, and a range of measurement values in the Z-axis direction". In a case where, for example, all of the measurement value in the X-axis direction, the measurement value in the Y-axis direction, and the measurement value in the Z-axis direction, which are acquired from the sensor 2040, are included in a range specified by the reference range, the determination unit 2062 judges that the measurement value acquired from the sensor 2040 is included in the reference range. However, the reference range does not necessarily need to indicate the range for each of the three axes, and may indicate the range for any one or more axes.

Note that, in the above-described example, whether or not the state of the secondary battery 2020 is dangerous is judged based on a single result of the comparison between the index value and the reference value. However, the determination unit 2062 may compare the index values, which are respectively computed at different points of times, with the reference value, and may judge whether or not the state of the secondary battery 2020 is dangerous based on a plural results of the comparison. For example, in a case where the danger level of the secondary battery 2020 is determined based on whether or not the index value is equal to or larger than the reference value, the determination unit 2062 compares the index values, which are acquired at different points of time, with the reference value, and judges that the state of the secondary battery 2020 is dangerous in only a case where the number of times of the index value being equal to or larger than the reference value, is equal to or larger than a predetermined number. The same applies to a case where the state of the secondary battery 2020 is judged to be dangerous in a case where the index value is equal to or smaller than the reference value, and a case where the index vector is compared with the reference range.

Further, the above-described index value may be a statistical value of the index values acquired at different points of time. It is possible to use, for example, an average value, a mode value, a maximum value, a minimum value, or the like as the statistical value. For example, the magnitude of the vibration applied to the secondary battery 2020 is computed for each of the plurality of points of time, and the statistical value of the plurality of computed values are used as an index value representing the vibration applied to the secondary battery 2020.

<<Case of Determining Danger Level Rank>>

The determination unit 2062 decides the danger level rank based on the magnitude of the index values acquired by the above-described various methods. As a premise, a numerical value range of possible index value is divided based on the number of danger level ranks in advance. Specifically, in a case where the number of danger level ranks is 1 to n, the numerical value range is divided into n ranges. The respective numerical value ranges generated through the division is called partial range. The determination unit 2062 determines a partial range which includes the index value acquired from the measurement value of the sensor 2040, and determines the danger level rank associated with the partial range as the danger level of the secondary battery 2020.

Figure 4:
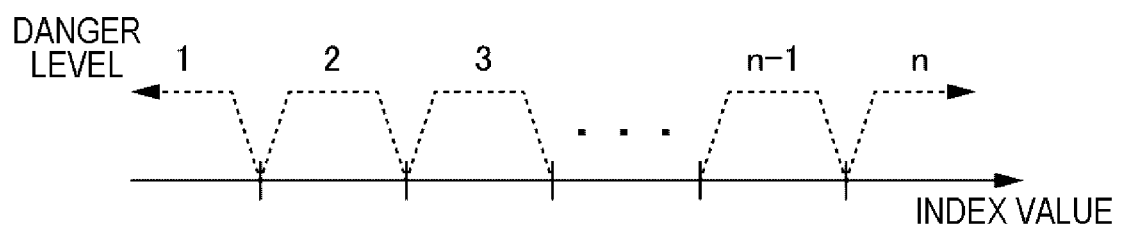
FIG. 4 is a diagram illustrating a method for deciding a danger level rank.
Figure 4:
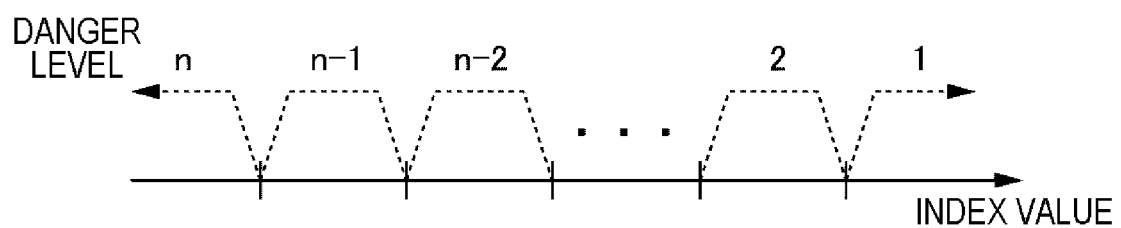

FIG. 4 is a diagram illustrating examples of a method for deciding the danger level rank. An example at an upper part of FIG. 4 is a case representing that it is more dangerous as the index value is larger. Therefore, the danger level rank increases as the partial range includes a larger value.

An example at a lower part of FIG. 4 is a case representing that the smaller the index value, the more dangerous. Therefore, the danger level rank increases as the partial range includes a smaller value.

In another example, as described above, it is assumed that, in a case where the three-axial acceleration sensor is used as the sensor 2040, the pose of the flying object 10 is estimated. In this case, a three-dimensional space represented by the combination of the measurement values of the three-axial acceleration sensor is divided by the number of danger level ranks, and the danger level ranks are assigned to respective subspaces. For example, a danger level rank 1 is assigned to a subspace representing the most normal pose, and a danger level rank n is assigned to a subspace representing the most dangerous pose. Further, the determination unit 2062 determines a subspace which includes the index vector represented by the measurement value acquired from the three-axial acceleration sensor, and sets the danger level rank corresponding to the determined subspace as the danger level of the secondary battery 2020.

Second Example Embodiment

Figure 5:
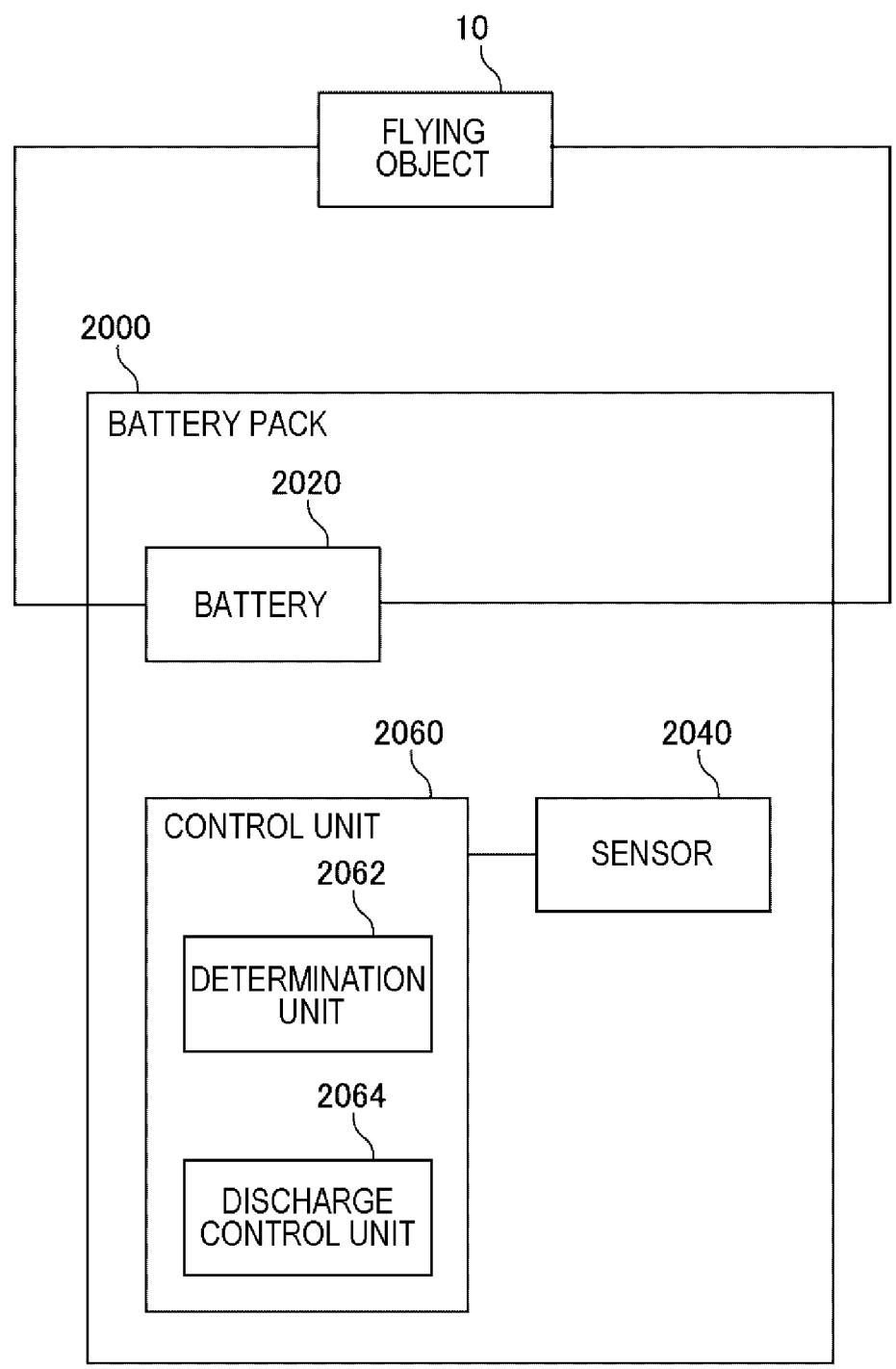
FIG. 5 is a diagram illustrating a battery pack according to a second example embodiment together with a use environment thereof.

FIG. 5 is a diagram illustrating a battery pack 2000 of a second example embodiment together with a use environment thereof. Except description below, the battery pack 2000 of the second example embodiment is the same as the battery pack 2000 of the first example embodiment.

In the battery pack 2000 of the second example embodiment, the control device 2060 includes a discharge control unit 2064. The discharge control unit 2064 controls discharge performed by the secondary battery 2020 according to the danger level of the secondary battery 2020 determined by the determination unit 2062. For example, the discharge control unit 2064 controls the discharge performed by the secondary battery 2020 in a case where the danger level of the secondary battery 2020, which is determined by the determination unit 2062, is high. Here, in a case where the danger level of the secondary battery 2020 is represented as "dangerous" or "not dangerous", a case where the danger level of the secondary battery 2020 is high means that the danger level of the secondary battery 2020 is "dangerous". On the other hand, in a case where the danger level of the secondary battery 2020 is represented using the danger level rank, a case where the danger level of the secondary battery 2020 is high means a case where the danger level rank of the secondary battery 2020 is equal to or higher than a predetermined value.

Figure 6:
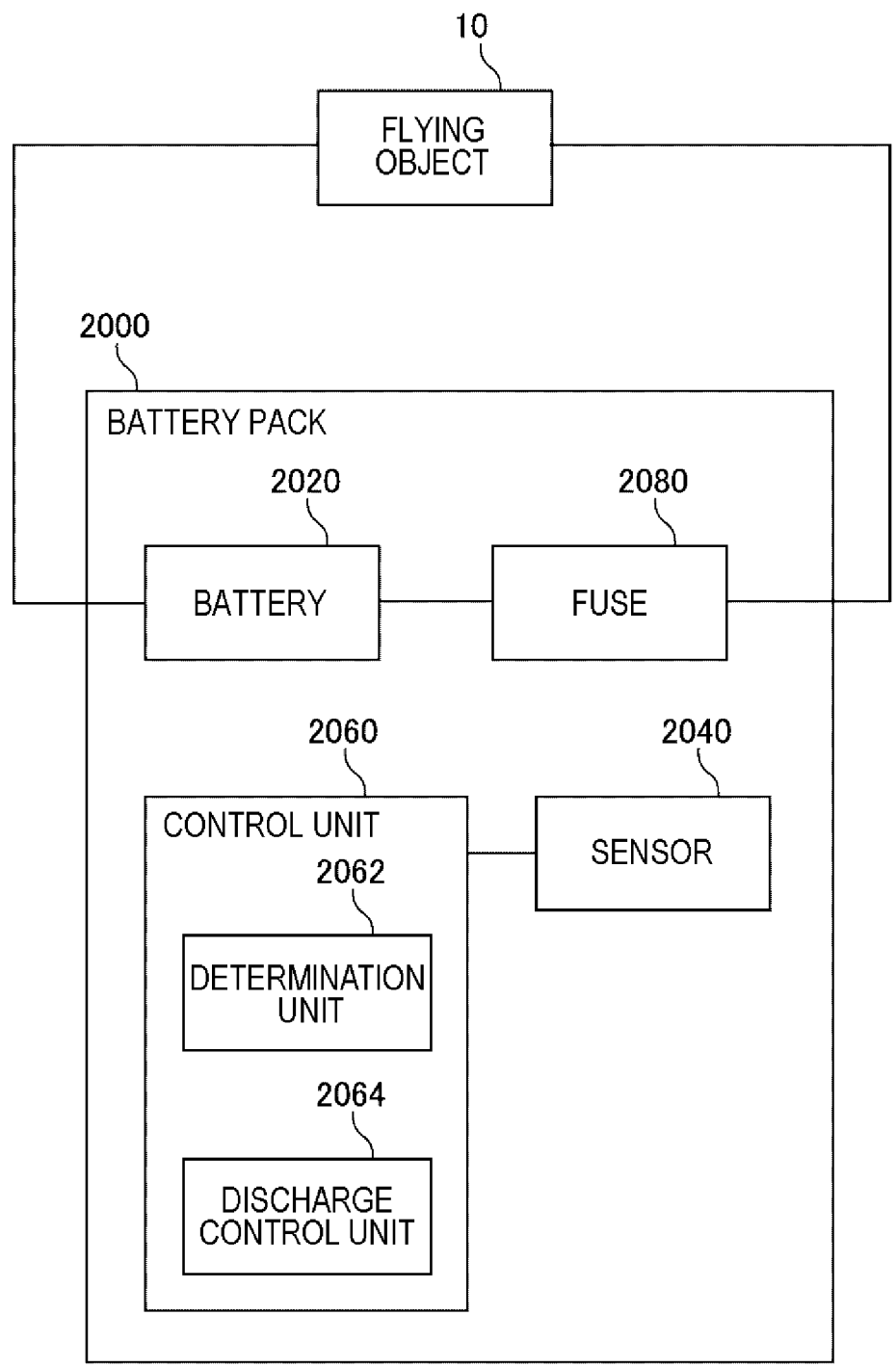
FIG. 6 is a diagram illustrating a case where a fuse is provided in a battery pack.

For example, in a case where the danger level of the secondary battery 2020 is high, the discharge control unit 2064 prevents currents from flowing from the secondary battery 2020 to an outside of the battery pack 2000. Specifically, a fuse that is capable of being cut by the discharge control unit 2064 is provided on an electric power line which is from the secondary battery 2020 to the outside of the battery pack 2000. FIG. 6 is a diagram illustrating a case where the fuse is provided in the battery pack 2000. The discharge control unit 2064 cuts the fuse 2080 in a case where the danger level of the secondary battery 2020 is high. In this manner, the currents are prevented from flowing from the secondary battery 2020 to the outside of the battery pack 2000.

Note that, it is possible to use an existing technology as a technology for cutting the fuse under a control of the control device. For example, in a case where a short circuit for cutting the fuse 2080 is prepared in advance and control is performed such that the currents flow to the short circuit, the fuse 2080 is cut.

A method for controlling the secondary battery 2020 by the discharge control unit 2064 is not limited to the method for cutting the fuse 2080. For example, the discharge control unit 2064 performs control for reducing residual energy of the secondary battery 2020. A reason for this is that it is preferable to reduce the residual energy of a battery mounted on the flying object in a case where any abnormality occurs while the flying object, such as a drone, is flying.

Figure 7:
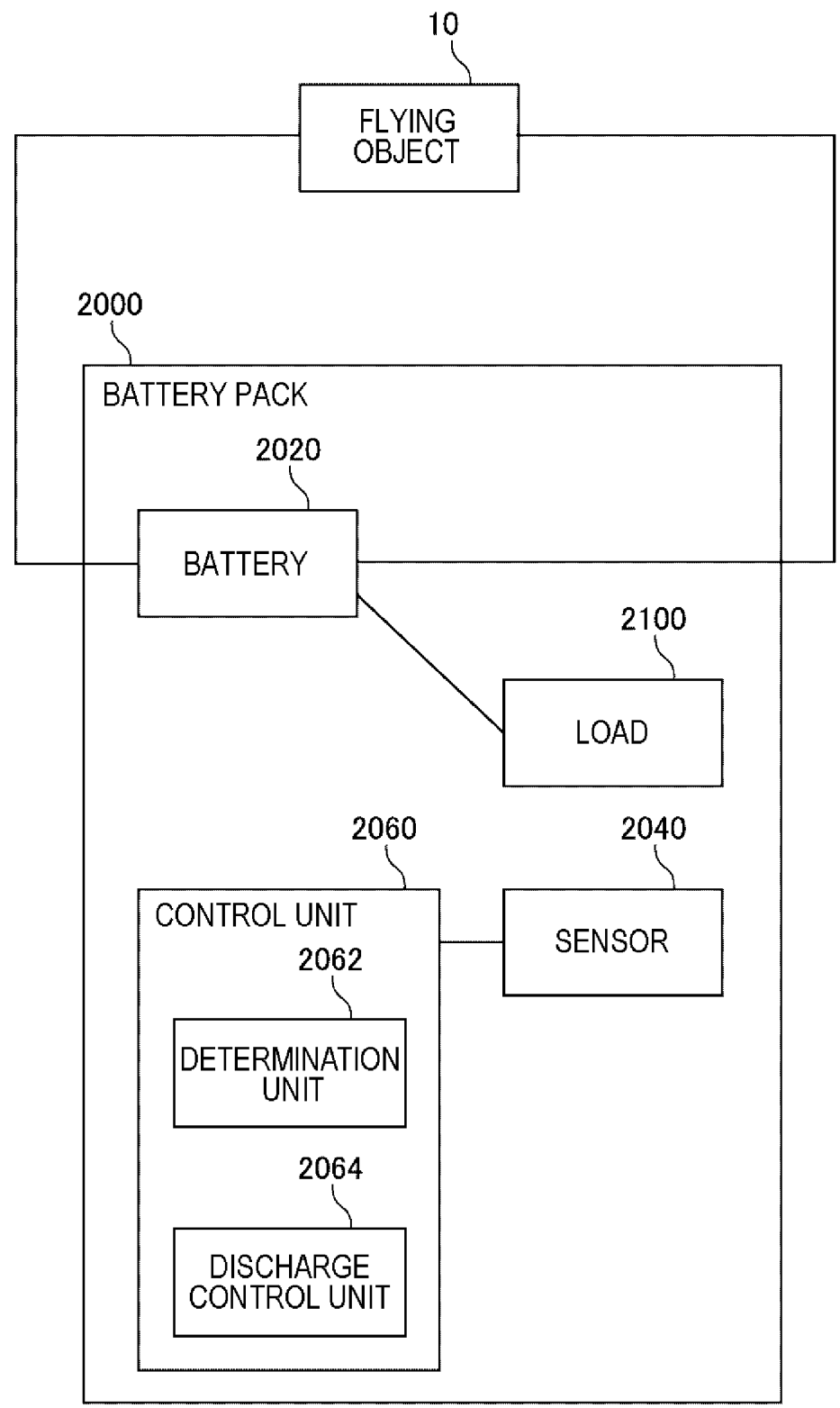
FIG. 7 is a diagram illustrating a battery pack including a load to which it is possible to supply electric power from the battery.

For example, a load to which the secondary battery 2020 can supply the electric power is provided in the battery pack 2000 separately from a supply destination (the flying object 10 or the like) to which the secondary battery 2020 supplies the electric power in a case of normal operation. FIG. 7 is a diagram illustrating the battery pack 2000 including a load, to which it is possible to supply the electric power from the secondary battery 2020. In a case where the danger level of the secondary battery 2020 is high, the discharge control unit 2064 causes the electric power to be supplied from the secondary battery 2020 to the load 2100 (discharge the secondary battery 2020). In this manner, the residual energy of the secondary battery 2020 is reduced.

However, in a case where any abnormality occurs while the flying object is flying, it is also preferable to move the flying object to a safe place. Therefore, the discharge control unit 2064 may control the magnitude of electric power supplied from the secondary battery 2020 to the load 2100 by taking energy required for movement of the flying object to a safe place into consideration. Hereinafter, a detailed method will be described.

In a case where it is judged that the danger level of the secondary battery 2020 is high, the discharge control unit 2064 decides a position at which the flying object 10 lands (hereinafter, a landing target position). Here, a method for deciding the landing target position will be described later. Further, the discharge control unit 2064 estimates time and energy required for moving the flying object 10 from a current position to the landing target position based on a distance from the current position of the flying object 10 to the landing target position and an altitude difference between the current point of time and the landing target position. The discharge control unit 2064 computes a difference between the residual energy of the secondary battery 2020 and the estimated energy.

The difference is the energy that is estimated to remain after reaching the landing target position. Here, the discharge control unit 2064 causes the secondary battery 2020 to discharge the amount of energy corresponding to the difference until the secondary battery 2020 lands. In this manner, the residual energy of the secondary battery 2020 can be eliminated by the time the flying object 10 lands. For example, the discharge control unit 2064 sets a value acquired by dividing the difference by an estimated time required until landing as the magnitude of the electric power supplied from the secondary battery 2020 to the load 2100.

However, the discharge amount of the secondary battery 2020 may be controlled by taking a possibility that the energy required until landing becomes larger than the estimated amount into consideration. For example, the discharge control unit 2064 computes the difference between the residual energy of the secondary battery 2020 and the energy estimated to be required for the flying object 10 to land, and further sets a value acquired by subtracting a predetermined margin from the difference as energy to be discharged to the secondary battery 2020 until landing.

In another example, the discharge control unit 2064 may repeatedly compute the difference between the energy required for movement of the flying object 10 from the current point of time to the landing target position and the residual energy of the secondary battery 2020 at the point of time, and may update the magnitude of the electric power output from the secondary battery 2020 to the load 2100 based on a computation result.

Alternatively, for example, the discharge control unit 2064 may perform control such that the discharge amount of the secondary battery 2020 is initially set to be small, and then the discharge amount is gradually increased.

There are various methods for deciding the landing target position of the flying object 10. For example, the control device 2060 decides a safe place closest to the current position of the flying object 10 using map information around a flight area of the flying object 10 and sets the decided place as a landing target position. The safe place is, for example, a place where no obstacle, such as a building or a tree, exists, or a place where few people enter. An attribute of the place is provided in map information in advance.

Note that, a function of deciding the landing target position may be included in a control device (an apparatus that controls flight of the flying object 10) provided on an inside of the flying object 10. In this case, the battery pack 2000 notifies the control device of the flying object 10 that the control device 2060 is in the dangerous situation (details will be described in a third example embodiment). The control device of the flying object 10 notifies the battery pack 2000 of the landing target position in response to the notification. The battery pack 2000 controls the discharge of the secondary battery 2020 using the landing target position acquired from the flying object 10.

Further, the discharge control unit 2064 may make discharge modes of the secondary battery 2020 different between a case where the flying object 10 is falling and a case after the flying object 10 lands. For example, the discharge control unit 2064 causes the magnitude of the electric power to be discharged from the secondary battery 2020 to the load 2100 after the flying object 10 lands to be larger than the magnitude of the electric power to be discharged from the secondary battery 2020 to the load 2100 while the flying object 10 is falling In this manner, while the amount of energy required for each flight of the flying object 10 is not fixed, that is, while the flying object 10 is flying, it is possible to reduce a probability of shortage of the energy by gradually outputting the energy from the secondary battery 2020. Then, after the flying object 10 lands and the energy remaining in the secondary battery 2020 becomes unnecessary, the electric power output from the secondary battery 2020 is increased, so that the residual energy of the secondary battery 2020 can be quickly exhausted. Note that, it is possible to use an existing technology as a technology for detecting that the flying object 10 lands.

Alternatively, for example, the discharge control unit 2064 may combine control using the fuse 2080 and control for causing the secondary battery 2020 to be discharged. For example, the discharge control unit 2064 causes the discharge to be performed from the secondary battery 2020 to the load 2100 without cutting the fuse 2080 while the flying object 10 is falling. Further, in a case where the flying object 10 lands, the discharge control unit 2064 cuts the fuse 2080 and further causes the discharge is performed from the secondary battery 2020 to the load 2100 until the residual energy of the secondary battery 2020 is exhausted. In this manner, it is possible to continue the flight of the flying object 10 until the flying object 10 lands, while reducing the residual energy of the secondary battery 2020.

<Process Flow>

Figure 8:
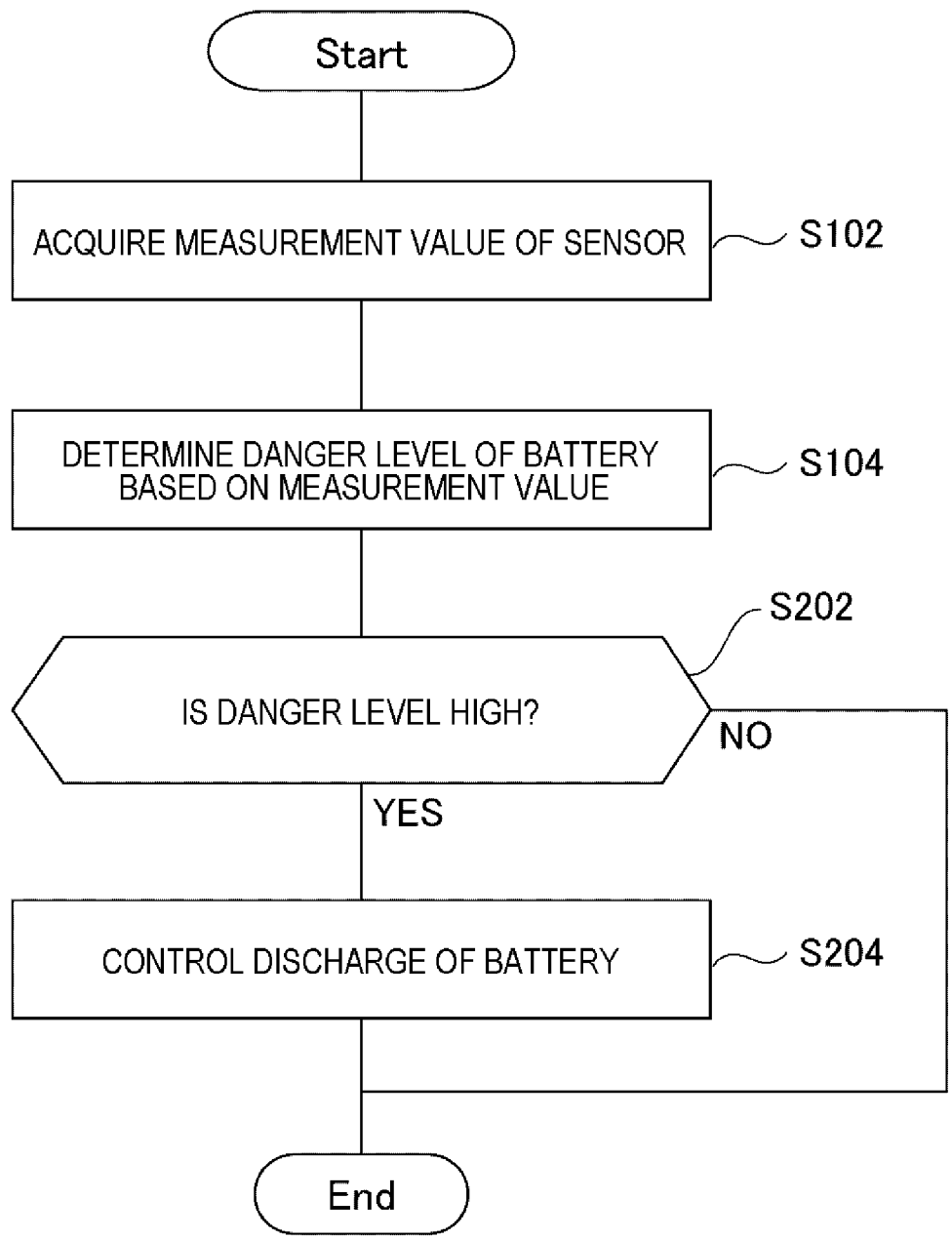
FIG. 8 is a flowchart illustrating a flow of a process executed by a control device according to the second example embodiment.

FIG. 8 is a flowchart illustrating a flow of a process executed by the control device 2060 according to the second example embodiment. S102 and S104 in FIG. 8 are the same processes as S102 and S104 in FIG. 3, respectively.

In a case where the danger level of the secondary battery 2020 determined in S104 is high (S202: YES), the discharge control unit 2064 controls the discharge of the secondary battery 2020 (S204). On the other hand, in a case where the danger level of the secondary battery 2020 determined in S104 is not high (S202: NO), the process in FIG. 8 ends.

However, the process performed by the control device 2060 according to the second example embodiment is not limited to the process illustrated in FIG. 8. For example, the discharge control unit 2064 may control the discharge of the secondary battery 2020 using the different modes according to the danger level rank of the secondary battery 2020. For example, the discharge control unit 2064 may increase the magnitude of the electric power supplied from the secondary battery 2020 to the load 2100 as the danger level rank of the secondary battery 2020 is high. In this manner, it is possible to cause the residual energy of the secondary battery 2020 to be gradually reduced in a case where the danger level of the secondary battery 2020 is relatively low, and it is possible to rapidly reduce the residual energy of the secondary battery 2020 in a case where the danger level of the secondary battery 2020 is relatively high.

<Example of Hardware Configuration>

A hardware configuration of a computer that realizes the control device 2060 according to the second example embodiment is represented with reference to, for example, FIG. 2, similarly to the first example embodiment. However, a program module that realizes functions of the control device 2060 of the present example embodiment is further stored in the storage device 1080 of the computer 1000 that realizes the control device 2060 of the present example embodiment.

<Advantageous Effect>

According to the present example embodiment, the discharge of the secondary battery 2020 is controlled according to the danger level of the secondary battery 2020. In this manner, it possible to appropriately control the supply of the electric power from the secondary battery 2020 to the flying object 10 and the amount of residual energy of the secondary battery 2020.

Third Example Embodiment

Figure 9:
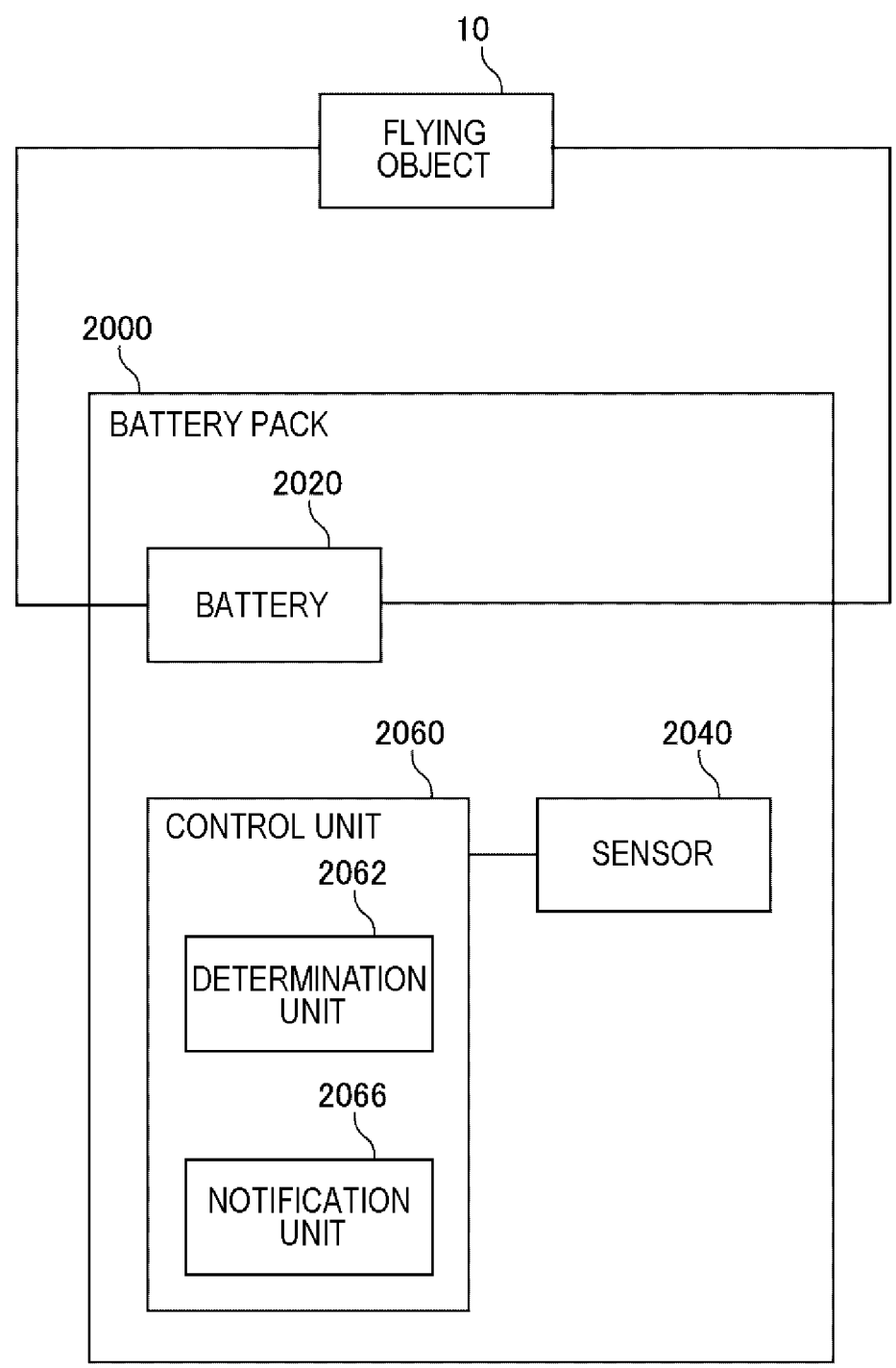
FIG. 9 is a block diagram illustrating a battery pack according to a third example embodiment.

FIG. 9 is a diagram illustrating a battery pack 2000 of a third example embodiment together with a use environment thereof. FIG. 9 is an illustrating block diagram. Except description below, the battery pack 2000 of the third example embodiment is the same as the battery pack 2000 of the first example embodiment or the battery pack 2000 of the second example embodiment.

In the battery pack 2000 of the third example embodiment, the control device 2060 includes a notification unit 2066. In a case where a danger level of the secondary battery 2020 is a predetermined danger level, the notification unit 2066 notifies that the secondary battery 2020 is in a dangerous state to an outside of the battery pack 2000. Hereinafter, a notification performed by the notification unit 2066 is referred to as a danger notification.

<Judgement of Whether or Not to Perform Danger Notification>

It is assumed that the danger level determined by the determination unit 2062 is either "dangerous" or "not dangerous". In this case, the notification unit 2066 performs the danger notification in a case where the determined danger level is "dangerous". On the other hand, the notification unit 2066 does not perform the danger notification in a case where the determined danger level is "not dangerous".

It is assumed that the danger level determined by the determination unit 2062 is represented by a danger level rank. In this case, for example, the notification unit 2066 performs the danger notification in a case where the determined danger level rank is equal to or higher than a predetermined value. On the other hand, in a case where the determined danger level rank is lower than the predetermined value, the notification unit 2066 does not perform the danger notification. Further, as will be described later, modes for danger notification may be made different according to the danger level rank.

<Transmission Destination of Danger Notification>

It is possible to use various things as a transmission destination of the danger notification. For example, the danger notification is transmitted to the flying object 10 (for example, a control device included in the flying object 10). In this case, in addition to an electric power line, a signal line is connected between the flying object 10 and the battery pack 2000. The danger notification is transmitted to the flying object 10 through the signal line.

In another example, the danger notification is transmitted to an arbitrary computer owned by an administrator or an owner of the flying object 10 using wireless communication. The computer may be a portable computer such as a smartphone or a tablet terminal, or may be a stationary computer such as a PC or a server machine. Note that, it is possible to use an existing technology as a technology for transmitting information from a computer mounted on the flying object 10 to an external computer. Note that, in a case where the wireless communication is used as above, the computer 1000 includes a hardware element (a network interface capable of performing the wireless communication) for transmitting the information through the wireless communication.

<Content of Danger Notification>

Figure 10:
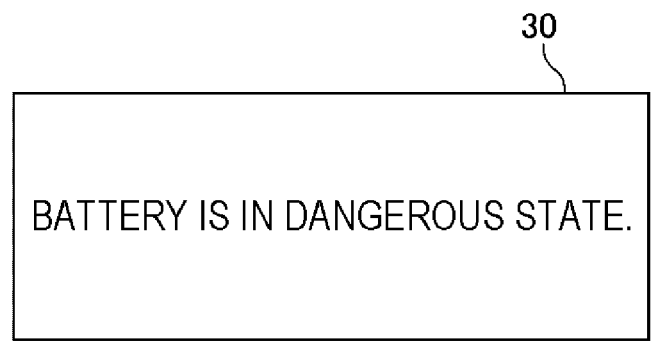
FIG. 10 is a diagram illustrating a danger notification.
Figure 10:
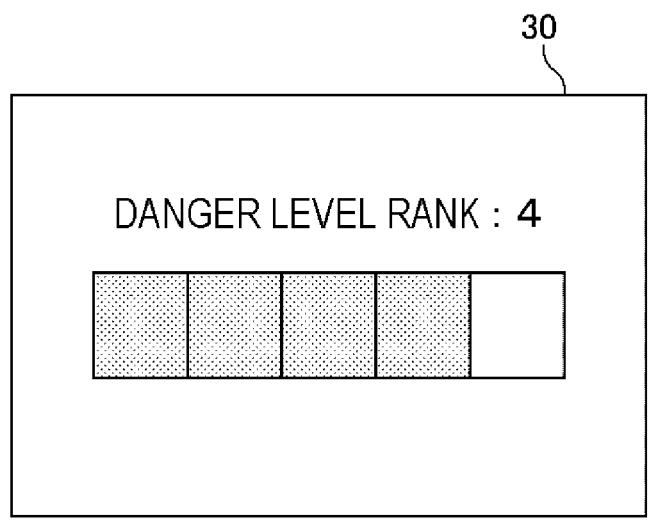

It is possible to use any notification, which indicates that the secondary battery 2020 is in the dangerous state, as the danger notification. FIG. 10 is a diagram illustrating the danger notification. A danger notification 30 in FIG. 10 is a message displayed on a display device such as a mobile terminal. In an upper part example in FIG. 10, the danger notification 30 is a message which indicates that the secondary battery 2020 is in the dangerous state. On the other hand, in a lower part example in FIG. 10, the danger notification 30 is a message which includes text information representing the danger level rank and a graphical display.

Note that, the danger notification may represent a state of the secondary battery 2020. For example, the danger level of the secondary battery 2020 is decided by judging the magnitude of the pressure or the like applied to the secondary battery 2020, whether or not the flying object 10 is falling, whether or not the pose of the flying object 10 is normal, or the like. Therefore, for example, the danger notification may include a notification representing that a large pressure or the like is applied to the secondary battery 2020, a notification representing that the flying object 10 is falling, a notification representing that the pose of the flying object 10 is not normal, or the like.

Figure 11:
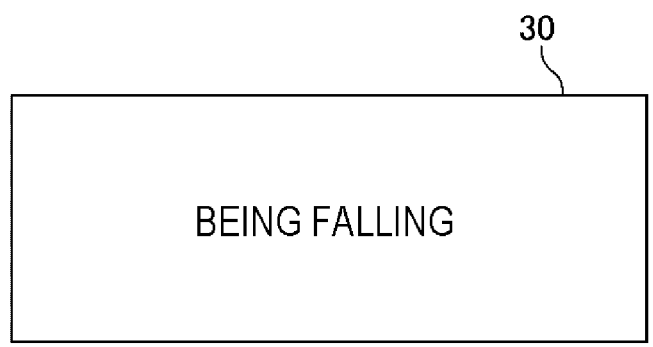
FIG. 11 is a diagram illustrating the danger notification including display representing a state of a battery.

FIG. 11 is a diagram illustrating the danger notification including a display representing the state of the secondary battery 2020. In FIG. 11, the danger notification 30 indicates that the flying object 10 is falling.

Here, in each of the above-described examples, the danger notification is output as visual information. However, the danger notification may be output auditory information using sounds. It is possible to use an existing technology as a detailed technology for performing notification using the sounds.

In a case where the danger notification is received by a computer possessed by the administrator of the flying object 10, the danger notification is output by the computer. For example, the output is executed by an application installed in the computer in advance. For example, the application is an application used to remotely control the flight of the flying object 10. Hereinafter, the application is referred to as a control application.

The control application receives the danger notification transmitted by the notification unit 2066. In a case where the danger notification is output as visual information, the control application generates screen data representing the danger notification based on content of the received danger notification. Further, the control application causes the display device connected to the computer, on which the control application operates, to output the generated screen data. Note that, it is possible to use an existing technology as a technology for generating the screen data based on the content of the received notification. In a case where the danger notification is output as the auditory information, the control application generates sound data representing the danger notification based on content of the received danger notification. Further, the control application causes a speaker connected to the computer, on which the control application operates, to output the generated sound signal. Note that, it is possible to use an existing technology as a technology for generating the sound data based on the content of the received notification.

<Case Where Both Discharge Control and Danger Notification Are Performed>

Figure 12:
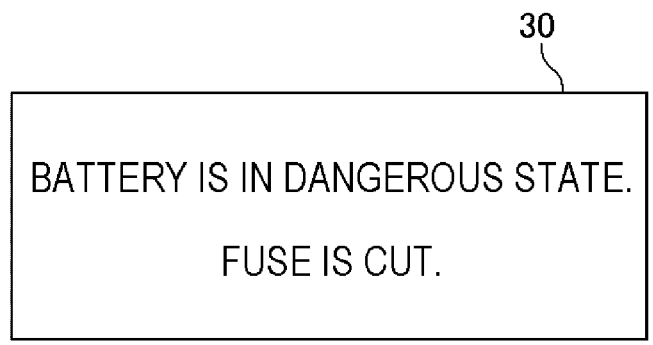
FIG. 12 is a diagram illustrating a danger notification indicating content of control performed by a discharge control unit.
Figure 12:
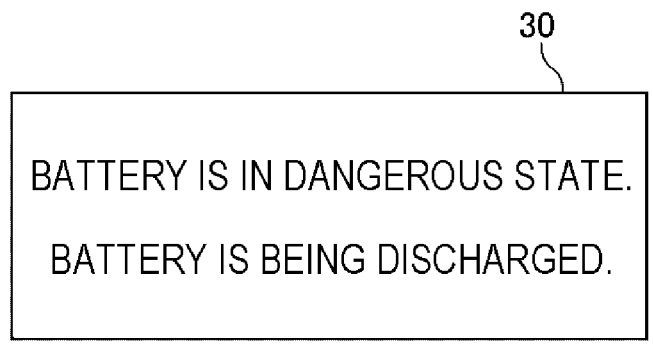

It is assumed that the battery pack 2000 of the third example embodiment includes the discharge control unit 2064 described in the second example embodiment. In this case, the danger notification may indicate content of control performed by the discharge control unit 2064. FIG. 12 is a diagram illustrating the danger notification indicating the content of the control performed by the discharge control unit 2064. In an upper part example of FIG. 12, the danger notification 30 indicates that the fuse 2080 is cut. In a lower part example of FIG. 12, the danger notification 30 indicates that the discharge of the secondary battery 2020 is performed.

In addition, a criterion used to judge whether or not the discharge control unit 2064 controls the discharge of the secondary battery 2020 and a criterion used to judge whether or not the discharge control unit 2064 performs the danger notification may be the same or may be different. In the former case, in a case where the danger level is "dangerous" or in a case where the danger level indicates a danger level rank which is equal to or higher than a predetermined value, both the control of the discharge, which is performed by the discharge control unit 2064, and the notification of the danger level, which is performed by the notification unit 2066, are performed.

Subsequently, the latter case will be described. In this case, the danger level is represented using the danger level rank. Further, a first predetermined value for judging whether or not to control the discharge of the secondary battery 2020 by the discharge control unit 2064, and a second predetermined value for judging whether or not to perform the danger notification by the notification unit 2066 are defined. The first predetermined value and the second predetermined value are values which are different from each other.

In a case where the danger level rank of the secondary battery 2020 is equal to or higher than the first predetermined value, the discharge control unit 2064 controls the discharge of the secondary battery 2020. In addition, in a case where the danger level rank of the secondary battery 2020 is equal to or higher than the second predetermined value, the notification unit 2066 performs the danger notification.

Here, the first predetermined value may be a value which is larger than the second predetermined value, or the second predetermined value may be a value which is smaller than the first predetermined value. However, it is preferable that the first predetermined value is larger than the second predetermined value. In this manner, in a situation in which the secondary battery 2020 is slightly different from normal time but it is not mentioned that a large abnormality exists, it is possible to notify an outside that the secondary battery 2020 is in a state which is slightly different from the normal time while maintaining a current state for the discharge performed by the secondary battery 2020. In this manner, for example, it is possible to judge whether or not to continue the flight of the flying object 10 taking into consideration a possibility that the state of the secondary battery 2020 is deteriorated if the flying object 10 is kept flying. In addition, in a case where the danger notification is transmitted to the flying object 10, it is possible for the flying object 10 to perform an operation of stopping after moving to the nearby safe place, an operation of returning to a place where the administrator of the flying object 10 or the like exist, and the like according to reception of the danger notification.

<Process Flow>

Figure 13:
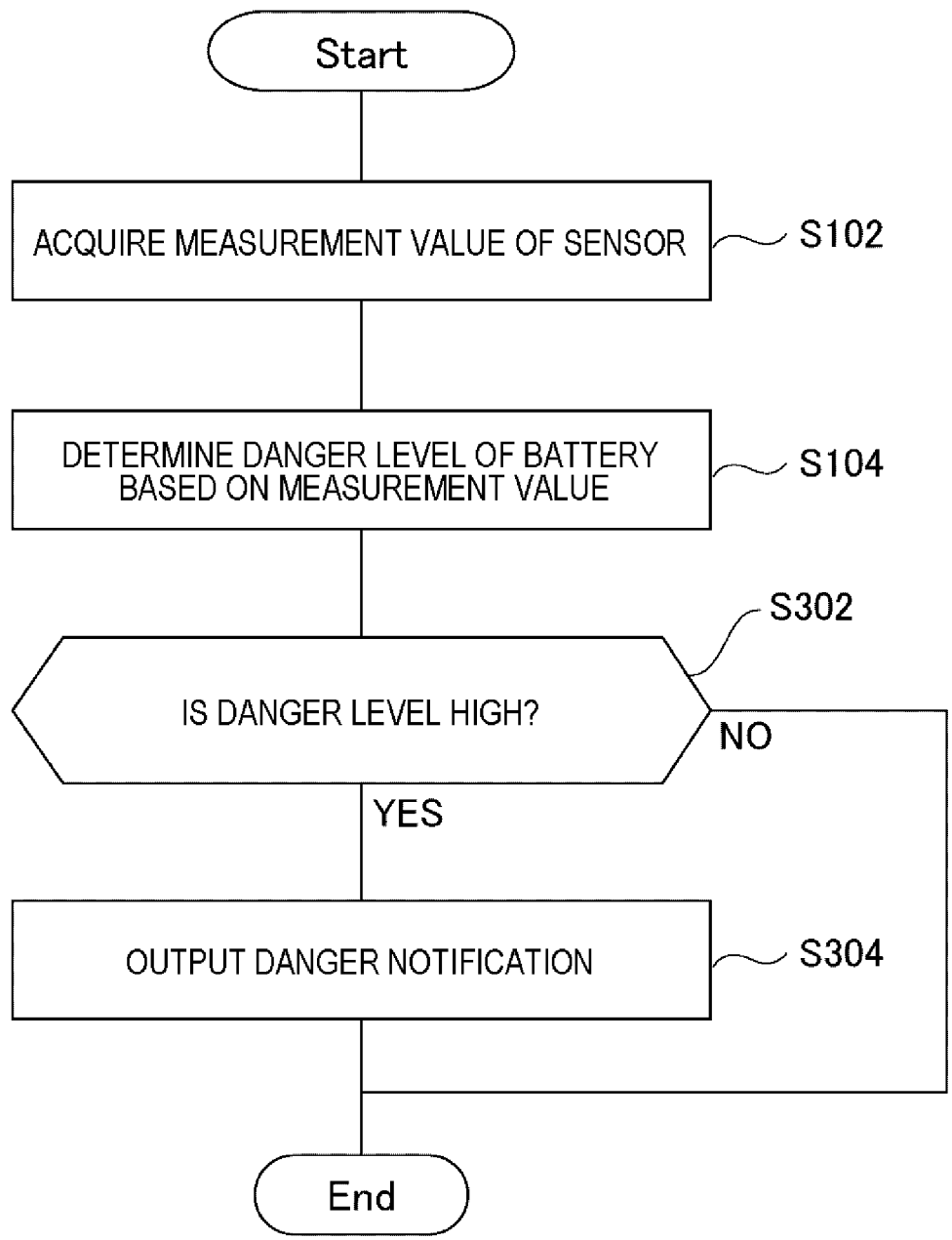
FIG. 13 is a flowchart illustrating a flow of a process executed by a control device according to the third example embodiment.

FIG. 13 is a flowchart illustrating a flow of a process executed by the control device 2060 according to the third example embodiment. S102 and S104 in FIG. 13 are the same processes as S102 and S104 in FIG. 3, respectively.

In a case where the danger level of the secondary battery 2020 determined in S104 is high (S302: YES), the notification unit 2066 outputs the danger notification (S304). On the other hand, in a case where the danger level of the secondary battery 2020 determined in S104 is not high (S302: NO), the process in FIG. 13 ends.

<Example of Hardware Configuration>

A hardware configuration of a computer that realizes the control device 2060 according to the third example embodiment is represented with reference to, for example, FIG. 2, similarly to the first example embodiment. However, a program module that realizes functions of the control device 2060 of the present example embodiment is further stored in the storage device 1080 of the computer 1000 that realizes the control device 2060 of the present example embodiment.

<Advantageous Effect>

According to the present example embodiment, the danger notification is output according to the danger level of the secondary battery 2020. Therefore, it is possible for the administrator or the like of the flying object 10 to recognize that the secondary battery 2020 is in the dangerous situation. In addition, in a case where the danger notification is output to the flying object 10, it is possible to cause the flight of the flying object 10 to be appropriately controlled.

Hereinabove, the example embodiments of the present invention have been described with reference to the accompanying drawings. However, the example embodiments are exemplifications of the present invention, and it is possible to use a configuration in which the example embodiments are combined and various configurations other than the above.

Although a part or all of the above-described example embodiment may be described as in the following supplementary, the present invention is not limited thereto.

1. A battery pack including a secondary battery that supplies electric power to a flying object,
a sensor that outputs a measurement value related to force applied to the secondary battery or a periphery thereof, and
a control device,
in which the control device includes a determination unit that determines a danger level of the secondary battery based on the measurement value of the sensor.

2. In the battery pack of 1, the determination unit estimates a magnitude of a pressure, an impact, or a vibration applied to the secondary battery or a periphery of the secondary battery based on the measurement value of the sensor, and determines the danger level of the secondary battery based on a difference between a result of the estimation and a reference value.

3. In the battery pack of 1, the determination unit estimates a pose of the flying object based on the measurement value of the sensor, and determines the danger level of the secondary battery based on the estimated pose.

4. In the battery pack of 1, the determination unit estimates whether or not the flying object is falling based on the measurement value of the sensor, and determines the danger level of the secondary battery based on a result of the estimation.

5. In the battery pack of any one of 1 to 4, the control device includes a control unit that controls discharge performed by the secondary battery in a case where the danger level of the secondary battery is equal to or higher than a predetermined danger level.

6. In the battery pack of 5, the control unit cuts a fuse provided on an electric power line for connecting the secondary battery to an outside of the battery pack in a case where the danger level of the secondary battery is equal to or higher than the predetermined danger level.

7. In the battery pack of 5, the control unit outputs the electric power of the secondary battery to a load which is different from the flying object in a case where the danger level of the secondary battery is equal to or higher than the predetermined danger level.

8. In the battery pack of 7, the control unit, in a case where the flying object is falling,
estimates energy required until the flying object lands, and
decides a magnitude of the electric power to be output from the secondary battery to the load based on a value acquired by subtracting the estimated energy from residual energy of the secondary battery.

9. In the battery pack of 7 or 8, the control unit causes the electric power of the secondary battery to be output to the load in both a case where the flying object is falling and a case after the flying object lands, and
a magnitude of the electric power to be output from the secondary battery to the load after the flying object lands is larger than a magnitude of the electric power to be output from the secondary battery to the load while the flying object is falling.

10. The battery pack of any one of 1 to 9 further includes a notification unit that notifies that the secondary battery is in a dangerous state to an outside of the battery pack in a case where the danger level of the secondary battery is equal to or higher than a predetermined danger level.

11. A control device included in the battery pack of any one of 1 to 10.

12. A control method executed by a control device that controls a battery pack,
the battery pack including a secondary battery that supplies electric power to a flying object, and a sensor that outputs a measurement value related to a force applied to the secondary battery or a periphery of the secondary battery,
the control method including a determination step of determining a danger level of the secondary battery based on the measurement value of the sensor.

13. In the control method of 12, the determination step includes estimating a magnitude of a pressure, an impact, or a vibration applied to the secondary battery or the periphery of the secondary battery based on the measurement value of the sensor, and determining the danger level of the secondary battery based on a difference between a result of the estimation and a reference value.

14. In the control method of 12, the determination step includes estimating a pose of the flying object based on the measurement value of the sensor, and determining the danger level of the secondary battery based on the estimated pose.

15. In the control method of 12, the determination step includes estimating whether or not the flying object is falling based on the measurement value of the sensor, and determining the danger level of the secondary battery based on a result of the estimation.

16. The control method of any one of 12 to 15 includes a control step of controlling discharge performed by the secondary battery in a case where the danger level of the secondary battery is equal to or higher than the predetermined danger level.

17. In the control method of 16, the control step includes cutting a fuse provided on an electric power line for connecting the secondary battery to an outside of the battery pack in a case where the danger level of the secondary battery is equal to or higher than the predetermined danger level.

18. In the control method of 16, the control step includes outputting the electric power of the secondary battery to a load different from the flying object in a case where the danger level of the secondary battery is equal to or higher than the predetermined danger level.

19. In the control method of 18, the control step includes, in a case where the flying object is falling,
estimating energy required until the flying object lands, and
deciding a magnitude of the electric power to be output from the secondary battery to the load based on a value acquired by subtracting the estimated energy from residual energy of the secondary battery, 20. In the control method of 18 or 19, the control step includes outputting the electric power of the secondary battery to the load in both a case where the flying object is falling and a case after the flying object lands, and a magnitude of the electric power to be output from the secondary battery to the load after the flying object lands is larger than a magnitude of the electric power to be output from the secondary battery to the load while the flying object is falling.

21. The control method of any one of 12 to 20 further includes a notification step of notifying that the secondary battery is in a dangerous state to an outside of the battery pack in a case where the danger level of the secondary battery is equal to or higher than a predetermined danger level.

22. A program for causing a control device that controls a battery pack to execute each step of the control method according to any one of 12 to 21.

This application claims priority based on Japanese Patent Application No. 2017-169409 filed on Sep. 4, 2017, the disclosure of which is incorporated herein in its entirety.

The invention claimed is:

1. A battery pack comprising:
a secondary battery that supplies electric power to a flying object;
a sensor that outputs a measurement value related to a force applied to the secondary battery or a periphery of the secondary battery; and
a control device,
wherein the control device includes a determination unit that determines a danger level of the secondary battery based on the measurement value of the sensor,
wherein the control device includes a control unit that controls discharge performed by the secondary battery so that residual energy of the secondary battery is exhausted in a case where the danger level of the secondary battery is equal to or higher than a predetermined danger level,
wherein the control unit outputs the electric power of the secondary battery to a load which is different from the flying object in the case where the danger level of the secondary battery is equal to or higher than the predetermined danger level, and
wherein the control unit, in a case where the flying object is falling, performs:
estimating energy required until the flying object lands; and
deciding a magnitude of the electric power to be output from the secondary battery to the load based on a value acquired by subtracting the estimated energy from residual energy of the secondary battery.

2. The battery pack according to claim 1,
wherein the determination unit estimates a magnitude of a pressure, an impact, or a vibration applied to the secondary battery or the periphery of the secondary battery based on the measurement value of the sensor, and determines the danger level of the secondary battery based on a difference between a result of the estimation and a reference value.

3. The battery pack according to claim 1,
wherein the determination unit estimates a pose of the flying object based on the measurement value of the sensor, and determines the danger level of the secondary battery based on the estimated pose.

4. The battery pack according to claim 1,
wherein the determination unit estimates whether or not the flying object is falling based on the measurement value of the sensor, and determines the danger level of the secondary battery based on a result of the estimation.

5. The battery pack according to claim 1,
wherein the control unit cuts a fuse provided on an electric power line for connecting the secondary battery to an outside of the battery pack in the case where the danger level of the secondary battery is equal to or higher than the predetermined danger level.

6. The battery pack according to claim 1, further comprising:
a notification unit that notifies that the secondary battery is in a dangerous state to an outside of the battery pack in the case where the danger level of the secondary battery is equal to or higher than the predetermined danger level.

7. A control device that is comprised in the battery pack according to claim 1.

8. A control method executed by a control device,
wherein the control device controls a battery pack, the battery pack including a secondary battery that supplies electric power to a flying object, and a sensor that outputs a measurement value related to a force applied to the secondary battery or a periphery of the secondary battery,
the control method comprising:
determining a danger level of the secondary battery based on the measurement value of the sensor,
wherein the control device includes a control unit that controls discharge performed by the secondary battery so that residual energy of the secondary battery is exhausted in a case where the danger level of the secondary battery is equal to or higher than a predetermined danger level,
wherein the control method further comprises:
outputting the electric power of the secondary battery to a load which is different from the flying object in the case where the danger level of the secondary battery is equal to or higher than the predetermined danger level, and
in a case where the flying object is falling:
estimating energy required until the flying object lands; and
deciding a magnitude of the electric power to be output from the secondary battery to the load based on a value acquired by subtracting the estimated energy from residual energy of the secondary battery.

9. A non-transitory computer-readable storage medium storing a program causing the control device that controls the battery pack to execute the control method according to claim 8.

10. A battery pack comprising:
a secondary battery that supplies electric power to a flying object;
a sensor that outputs a measurement value related to a force applied to the secondary battery or a periphery of the secondary battery; and
a control device,
wherein the control device includes a determination unit that determines a danger level of the secondary battery based on the measurement value of the sensor,
wherein the control device includes a control unit that controls discharge performed by the secondary battery so that residual energy of the secondary battery is exhausted in a case where the danger level of the secondary battery is equal to or higher than a predetermined danger level, wherein the control unit outputs the electric power of the secondary battery to a load which is different from the flying object in the case where the danger level of the secondary battery is equal to or higher than the predetermined danger level, wherein the control unit outputs the electric power of the secondary battery to the load in both a case where the flying object is falling and a case after the flying object lands, and wherein a first magnitude of the electric power to be output from the secondary battery to the load after the flying object lands is larger than a second magnitude of the electric power to be output from the secondary battery to the load while the flying object is falling.

11. The battery pack according to claim 10, wherein the determination unit estimates a magnitude of a pressure, an impact, or a vibration applied to the secondary battery or the periphery of the secondary battery based on the measurement value of the sensor, and determines the danger level of the secondary battery based on a difference between a result of the estimation and a reference value.

12. The battery pack according to claim 10, wherein the determination unit estimates a pose of the flying object based on the measurement value of the sensor, and determines the danger level of the secondary battery based on the estimated pose.

13. The battery pack according to claim 10, wherein the determination unit estimates whether or not the flying object is falling based on the measurement value of the sensor, and determines the danger level of the secondary battery based on a result of the estimation.

14. The battery pack according to claim 10, wherein the control unit cuts a fuse provided on an electric power line for connecting the secondary battery to an outside of the battery pack in the case where the danger level of the secondary battery is equal to or higher than the predetermined danger level.

15. The battery pack according to claim 10, further comprising:

a notification unit that notifies that the secondary battery is in a dangerous state to an outside of the battery pack in the case where the danger level of the secondary battery is equal to or higher than the predetermined danger level.

* * * * *